April 19, 1932.  H. BERTHOLD  1,854,880

ELECTRIC LIQUID HEATER

Filed June 16, 1930

H. Berthold
INVENTOR

By: Marks & Clerk
Attys.

Patented Apr. 19, 1932

1,854,880

UNITED STATES PATENT OFFICE

HANS BERTHOLD, OF BERLIN-TEGEL, GERMANY, ASSIGNOR TO GUSTAV ROBERT PAALEN, OF BERLIN, GERMANY

ELECTRIC LIQUID HEATER

Application filed June 16, 1930, Serial No. 461,542, and in Germany May 26, 1930.

This invention relates to an electric liquid heater in which the liquid is heated while it flows through the heater. The chief characteristic feature of the present improved heater resides therein that the pressure of the liquid flowing through the heater acts upon a slidable contact member, more precisely, upon a vertically movable, plunger-like contact member which, when being lifted by the pressure of the liquid contacts with another contact member whereby the circuit is closed and the electrical heating body proper located in the heater is rendered very hot so as to heat the liquid present in the heater while it is flowing through the same.

The circuit is closed and opened perfectly automatically as soon as the cock or valve of the liquid pipe is opened or closed. In other words: as long as liquid is permitted to flow through the heater this liquid is heated, and the heating ceases instantly when the flow of the liquid is interrupted.

A particularly advantageous constructional form of the heater is this in which the casing enclosing the electric heating body proper is provided with a vertical central tube extending upwardly from the outlet spout or the like of the casing into the same and terminating at some distance from the top or cover thereof, and in which the electric heating body is cylindrical and arranged in the tubular space between said tube and the casing wall, and in which the free end of the said tube is normally kept closed by a rubber disk which can be lifted by the pressure of the liquid flowing through the heater, and in which a contact is closed by the rubber disk when it is lifted, as just said. The disk can be lifted and the circuit be closed only when liquid is flowing through the heater, that is to say, when there has arisen a pressure in the heater casing owing to the cock or valve of the liquid pipe having been opened. As long as the cock or valve is open the liquid which stands under the pressure of the main keeps the contact members in contact, that is to say, keeps the circuit closed, but instantly when that pressure ceases to act the circuit is interrupted, in every case absolutely automatically, without any exterior, manually operable switch or the like.

Figure 1:
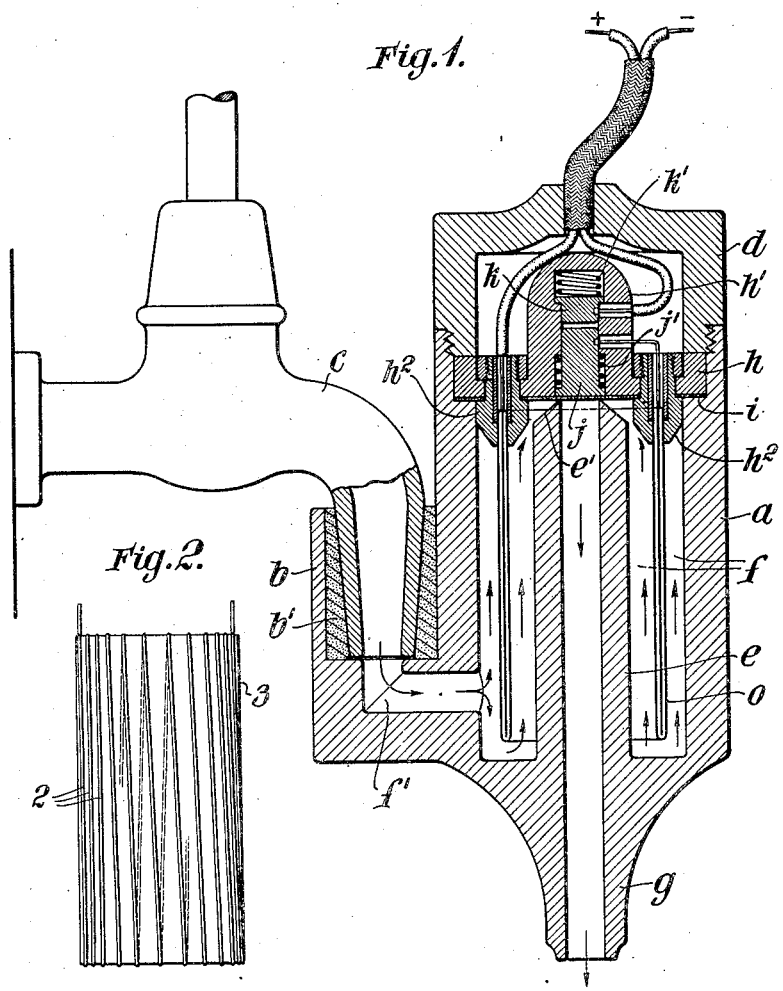
Figure 2:
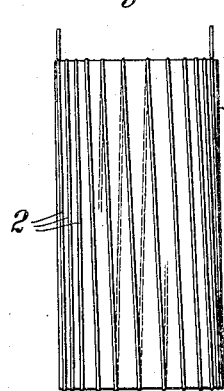
Figure 3:
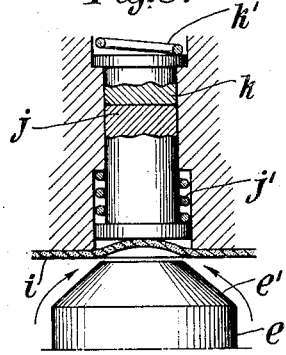
Figure 4:
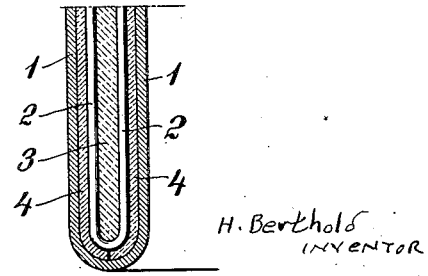

The invention is illustrated diagrammatically and by way of example on the accompanying drawings on which Figure 1 is a vertical section through a liquid heater designed according to this invention, Figure 2 is a separate side view of the electric heating body proper thereof, Figure 3 is a separate side of the members for switching the current on and off, these members and the adjacent parts being drawn to an enlarged scale, and Figure 4 is a vertical section through a portion of the lowermost part of the electric heating body proper drawn to a greatly enlarged scale relatively to Figs. 1 and 2.

On the drawings, $a$ denotes the casing of the heater; it consists of porcelain, so-called trolon, troletan, or the like, and is provided with an upwardly opening branch $b$ equipped with a lining $b'$ of rubber or the like. This branch with its lining serves for attaching the heater tightly to an ordinary cock $c$. The uppermost part of the casing is formed by a cover $d$ connected with the body of the casing by screw-threads so that it can be easily detached and attached together with the parts affixed to it.

Inside the casing, more especially, its body, is a tube $e$ extending upwardly from the lowermost part of the body and being generally made integral with it. Between this tube and the wall of the body is a tubular space $f$ which communicates at its lower end with the passage $f'$ through which the liquid, generally water from the house main, flows into said space, and at its upper end with the upper end of the tube $e$. The passage in this tube is downwardly elongated through the lowermost part of the casing where it forms the outlet $g$.

Just below the cover $d$ is arranged a horizontal plate $h$ which closes the body of the casing. The plate $h$ is inserted into an annular inner recess of said body, as is also a rubber disk located just below said plate. On the middle portion of the plate $h$ is an elevated part $h'$ made integral with said plate and resembling somewhat a thimble and having a vertical bore in which are located two plunger-like contact members *j* and *k*, of which *j* is located just over the rubber disk *i* and is subjected to the pressure of a helical spring *j'* surrounding it, whereas the contact member *k* is located above the first-mentioned contact member and is subjected to the action of a helical spring *k'* by which it is pressed upon an internal shoulder of the elevated part *h'*. Normally, the two contact members are spaced, as shown in Fig. 1. The contact member *k* is conductively connected with one of the current-carrying wires, also as shown in Fig. 1.

*o* denotes a tubular electric heating body which is arranged in the annular space *f* and is suspended from the plate *h*; it is connected with this plate by means of two insulating nipples *h²*. Through one of these nipples passes the other of the current-carrying wires, and through the other nipple passes a short wire by which the heating body *c* is conductively connected with the contact member *j*. The circuit is closed when this contact member is lifted so as to contact with the contact member *k*. The current will then pass through the heating body and heat it.

The heating body *o* consists of two spaced concentric metallic shells which are tightly connected with one another at their upper and their lower ends and between which is located the electric heating body proper which is designed preferably in the manner shown and described in my United States application signed at the consul's on May 22, 1930. The principle embodied in this heating body is disclosed in Fig. 4 which shows an axial section through the lowermost part of one of the sides of the heating body *o*, but drawn to a greatly enlarged scale. In this Fig. 4 (also in Fig. 3) 3 denotes a cylinder of mica, and 2 denotes the heating wire which is wound practically spirally over the outer and the inner surface of said mica cylinder (Fig. 2). I wish it to be understood that instead of an actual wire (with round or circular sectional area) a narrow band of foil-like thickness, or thinness respectively, may be used, and, in fact, I prefer to make use of an electric conductor of this kind, especially such a one of chrome-nickel. The outer and the inner windings of the conductor 2 are covered with layers of mica 4, and these layers are covered with the metal shells 1, there being, thus, an outer shell and an inner one, as appears clearly from Fig. 4. The actual thickness of the wall of the heating body 1—2—3—4 is about that shown in Fig. 1, and its actual size (height and diameter) is about that shown in Figs. 1 and 2. The several layers constituting this heating body are firmly pressed upon one another with such a strength that practically no detrimental air-containing spaces remain between the layers and the portion forming them, in consequence whereof the thermal efficiency of this heating body is extraordinarily great.

The manner of operation of the liquid heater is as follows:

When the cock *c* is opened the water flows through the passage *f'* into the space *f* where it surrounds the heating body *o* and rises up to the upper edge of the same which is a little remote from the rubber disk *i*, as shown in Fig. 1. As the middle portion of the rubber disk and the contact member *j* can yield to the pressure of the liquid, the member *j* is lifted and contacts with the contact member *k* whereby the circuit is closed. The circuit remains closed as long as the cock is open, in that the pressure of the liquid continues to lift the central portion of the rubber disk, as in Fig. 3, and this being so, the liquid (generally water) flowing through the device is continually heated, the spout *g* delivering, therefore, continually hot water. But when the cock is closed and the pressure of the liquid, thus, ceases to act upon the contact member *j* this member is pressed down into its position of rest by the spring *j'* so that the circuit is instantly broken. Thus, switching the current on and off proceeds perfectly automatically, the only member requiring actuation being the grip of the plug of the cock.

A particular feature worth emphasizing is the formation of the upper end of the tube *e* which is shaped as a truncated cone *e'*, in consequence of which the liquid flows particularly smoothly and uniformly over the top face of said tube without any noise-producing vibrations of the rubber disk. There would arise such vibrations if the top face of the tube were flat.

I claim:

1. A liquid heater, comprising, in combination, a casing having a lateral inlet opening, and an outlet opening in its lower end; a tube extending from said outlet opening upwardly into the interior of said casing; a cylindrical electrical heating body arranged in the tubular space between said tube and the casing wall; a transverse plate arranged in the casing just over the said tube and having a downwardly opening bore in it, and a rubber plate provided at the bottom face of said disk and closing said bore and contacting normally with the free end of the said tube so as to close it; two insulating nipples extending downwardly from said plate and having the insulating body attached to it; a contact member in the bore of the plate and a conducting connection between this contact member and the heating body, this connection extending through one of said nipples; another contact member located above that first-mentioned and being normally kept remote therefrom and being conductively connected with one of the circuit wires, the other circuit wire extending through the other nipple and being conductively connected with the said heating body; the first-mentioned contact member being adapted to be lifted by the pressure of the liquid flowing through the heater, substantially as set forth.

2. A liquid heater, comprising, in combination, a casing having a lateral inlet opening, and an outlet opening in its lower end; a tube extending from said outlet opening upwardly into the interior of said casing; a cylindrical electrical heating body arranged in the tubular space between said tube and the casing wall; a transverse plate arranged in the casing just over the said tube and having an upwardly directed protuberance and a bore extending from its bottom face into said protuberance; a rubber plate provided at the bottom face of said disk and closing said bore and contacting normally with the free end of the said tube so as to close it; two superposed contact members arranged in said bore, the lower thereof being adapted to be lifted against the upper thereof by the intermediary of said rubber disk when the centre portion of this disk is bulged out upwardly by the pressure of the liquid flowing through the heater; and conducting connections between the circuit wires and the said heating body, as well as the upper of said contact members, substantially as set forth.

In testimony whereof I affix my signature.

HANS BERTHOLD.